(12) United States Patent
Zhang

(10) Patent No.: US 10,681,200 B2
(45) Date of Patent: *Jun. 9, 2020

(54) MESSAGE PROCESSING METHOD AND SYSTEM, AND RELATED DEVICE

(71) Applicant: HUAWEI TECHNOLOGIES CO., LTD., Shenzhen, Guangdong (CN)

(72) Inventor: Yajun Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/270,649

(22) Filed: Feb. 8, 2019

(65) Prior Publication Data

US 2019/0173991 A1 Jun. 6, 2019

Related U.S. Application Data

(63) Continuation of application No. 15/507,202, filed on Feb. 27, 2017, now Pat. No. 10,250,732, which is a
(Continued)

(51) Int. Cl.
*H04B 7/00* (2006.01)
*H04M 1/725* (2006.01)
(Continued)

(52) U.S. Cl.
CPC ......... *H04M 1/7253* (2013.01); *H04M 1/725* (2013.01); *H04M 1/72569* (2013.01);
(Continued)

(58) Field of Classification Search
CPC . H04M 1/7253; H04M 1/72569; H04W 4/80; H04W 8/005; H04W 68/005; H04W 88/02
(Continued)

(56) References Cited

U.S. PATENT DOCUMENTS 9,141,194 B1 * 9/2015 Keyes .................... G06F 3/017
9,317,155 B2    4/2016 Magi
(Continued)

FOREIGN PATENT DOCUMENTS

CN    102023793 A    4/2011
CN    102170497 A    8/2011
(Continued)

OTHER PUBLICATIONS

Chinese Office Action issued in Chinese Application No. 201480028933 dated Aug. 2, 2018, 23 pages.

*Primary Examiner* — Sonny Trinh
(74) *Attorney, Agent, or Firm* — Fish & Richardson P.C.

(57) ABSTRACT

Example embodiments of the present disclosure disclose message processing methods and systems, and related devices. One example method includes receiving a message, and determining a distance between a user equipment and a wearable device connected with the user equipment. When the distance between the user equipment and the wearable device is greater than a preconfigured distance, information of the message is recorded without providing the information of the message. When the distance between the user equipment and the wearable device is less than the preconfigured distance, the information of the message is provided.

18 Claims, 4 Drawing Sheets

Related U.S. Application Data continuation of application No. PCT/CN2014/085556, filed on Aug. 29, 2014.

(51) Int. Cl.

| | | |
|---|---|---|
| *H04M 19/04* | (2006.01) | |
| *H04W 4/80* | (2018.01) | |
| *H04W 4/12* | (2009.01) | |
| *H04W 8/00* | (2009.01) | |
| *H04W 68/00* | (2009.01) | |
| *H04W 88/02* | (2009.01) | |

(52) U.S. Cl.
CPC ............ *H04M 19/04* (2013.01); *H04W 4/12* (2013.01); *H04W 4/80* (2018.02); *H04W 8/005* (2013.01); *H04W 68/005* (2013.01); *H04W 88/02* (2013.01)

(58) Field of Classification Search
USPC ........ 455/41.2, 41.3, 517, 404.2, 456.1, 457
See application file for complete search history.

(56) References Cited

U.S. PATENT DOCUMENTS

| | | | |
|---|---|---|---|
| 9,509,828 B2* | 11/2016 | Lee | ..................... H04M 1/7253 |
| 9,730,006 B1* | 8/2017 | Krishnamoorthy | ... H04W 24/10 |
| 9,774,997 B2* | 9/2017 | Cui | ........................ H04L 51/20 |
| 10,182,416 B2* | 1/2019 | Peterson | ............ H04W 68/005 |
| 2001/0007817 A1 | 7/2001 | Odagiri et al. | |
| 2004/0021567 A1 | 2/2004 | Dunn | |
| 2004/0172290 A1 | 9/2004 | Leven | |
| 2006/0199534 A1 | 9/2006 | Smith | |
| 2007/0287425 A1* | 12/2007 | Bates | ..................... H04W 4/12 |
| | | | 455/412.1 |
| 2008/0200123 A1 | 8/2008 | Lin et al. | |
| 2010/0279663 A1* | 11/2010 | Wang | ................ H04M 3/53366 |
| | | | 455/413 |
| 2014/0188348 A1 | 7/2014 | Gautama et al. | |
| 2014/0194064 A1* | 7/2014 | Murakami | .............. H04W 4/80 |
| | | | 455/41.2 |
| 2015/0058942 A1 | 2/2015 | Dermu | |
| 2015/0147065 A1 | 5/2015 | Civelli et al. | |
| 2015/0150122 A1 | 5/2015 | Son et al. | |
| 2015/0153571 A1 | 6/2015 | Ballard et al. | |
| 2015/0186636 A1 | 7/2015 | Tharappel et al. | |
| 2015/0189056 A1 | 7/2015 | Magi | |
| 2015/0316415 A1 | 11/2015 | Islam | |
| 2015/0358088 A1 | 12/2015 | Eim et al. | |
| 2015/0362997 A1 | 12/2015 | Hatton | |
| 2015/0365825 A1 | 12/2015 | David De Léon et al. | |
| 2016/0036965 A1 | 2/2016 | Kim | |
| 2016/0037346 A1 | 2/2016 | Boettcher et al. | |
| 2016/0044445 A1 | 2/2016 | Hu et al. | |
| 2016/0050204 A1 | 2/2016 | Anderson | |
| 2016/0119789 A1 | 4/2016 | Hu et al. | |
| 2016/0262116 A1 | 9/2016 | Ying et al. | |
| 2016/0277557 A1 | 9/2016 | Yang et al. | |
| 2017/0200014 A1 | 7/2017 | Jing | |
| 2017/0279746 A1 | 9/2017 | Roussel | |
| 2017/0303129 A1 | 10/2017 | Boettcher et al. | |
| 2018/0014172 A1 | 1/2018 | Baldree | |
| 2019/0109932 A1* | 4/2019 | Higgins | .................. H04M 1/21 |

FOREIGN PATENT DOCUMENTS

| | | |
|---|---|---|
| CN | 103018715 A | 4/2013 |
| CN | 103401991 A | 11/2013 |
| CN | 103445409 A | 12/2013 |
| CN | 103809758 A | 5/2014 |
| JP | 2010245668 A | 10/2010 |
| WO | 2015127834 A1 | 9/2015 |

\* cited by examiner

MESSAGE PROCESSING METHOD AND SYSTEM, AND RELATED DEVICE

CROSS REFERENCE TO RELATED APPLICATIONS

This application is a continuation of U.S. patent application Ser. No. 15/507,202, filed on Feb. 27, 2017, which is a national stage of International Application No. PCT/CN2014/085556 filed Aug. 29, 2014. All of the aforementioned applications are hereby incorporated by reference in their entireties.

TECHNICAL FIELD

The present invention relates to the field of communications technologies, and in particular, to a message processing method and system, and a related device.

BACKGROUND

Currently, wearable devices are successively put into mass electronic consumer markets, where the wearable devices may have various forms, such as watches, glasses, or even computers. A device that meets an easily wearable (converged with conventional accessories) form, and has an independent computing capability and a dedicated application program and function can be classified into a wearable device. For example, a smart band can detect a motion index, sleep quality, and various vital signs of a user; a smart watch can be used as a mobile phone mate to help control a smartphone to answer an incoming call, send an SMS message, photograph, and so on.

If a wearable device is paired to user equipment such as a mobile phone for use, the wearable device can provide an alert for a message received by the user equipment. Because of convenience for use, such application is widely accepted by users. Therefore, how to process the message received by the user equipment is a relatively important problem.

SUMMARY

Embodiments of the present invention provide a message processing method and system, and a related device, and provide different message processing methods used according to information about a distance between user equipment and a wearable device, or power information of a transmit signal of the user equipment.

A first aspect of the embodiments of the present invention provides a message processing method, including:

when a wearable device and user equipment are in a connected state, if the user equipment receives a new message, determining, by the user equipment, information about a distance between the user equipment and the wearable device, or determining power information of a transmit signal from the user equipment to the wearable device; and determining, by the user equipment according to the determined distance information or power information, that a processing manner for the new message is any one or more of the following processing manners: a first message processing manner, a second message processing manner, or a third message processing manner; where the first message processing manner is sending a notification message to the wearable device, where the notification message is used to instruct the wearable device to provide an alert for a message; the second message processing manner is recording information about the new message; and the third message processing manner is providing an alert for a message by using the user equipment.

In a first possible implementation manner of the first aspect of the embodiments of the present invention, the determining, by the user equipment according to the determined distance information or power information, a processing manner for the new message specifically includes:

providing, by the user equipment, an alert for the new message in the first message processing manner or processing, by the user equipment, the new message in the second message processing manner if the distance between the user equipment and the wearable device is greater than a preconfigured distance or a power level of the transmit signal of the user equipment is a first power level; or providing, by the user equipment, an alert for the new message in the third message processing manner if the distance between the user equipment and the wearable device is less than or equal to the preconfigured distance or a power level of the transmit signal of the user equipment is the second power level; where a power of the transmit signal is greater than a preconfigured value when the user equipment is at the first power level, or a power of the transmit signal is less than or equal to a preconfigured value when the user equipment is at the second power level.

With reference to the first possible implementation manner of the first aspect of the embodiments of the present invention, in a second possible implementation manner of the first aspect of the embodiments of the present invention, if the user equipment receives the new message, the method further includes: determining a configuration type of the wearable device; and the providing, by the user equipment, an alert for the new message in the first message processing manner if the distance between the user equipment and the wearable device is greater than a preconfigured distance or a power level of the transmit signal of the user equipment is a first power level specifically includes: providing, by the user equipment, an alert for the new message in the first message processing manner if the distance between the user equipment and the wearable device is greater than the preconfigured distance or the power level of the transmit signal of the user equipment is the first power level, and the configuration type of the wearable device is a configurable type; or the processing, by the user equipment, the new message in the second message processing manner if the distance between the user equipment and the wearable device is greater than a preconfigured distance or a power level of the transmit signal of the user equipment is a first power level specifically includes: processing, by the user equipment, the new message in the second message processing manner if the distance between the user equipment and the wearable device is greater than the preconfigured distance or the power level of the transmit signal of the user equipment is the first power level, and the configuration type of the wearable device is a non-configurable type.

In a third possible implementation manner of the first aspect of the embodiments of the present invention, the method further includes:

determining any one or more pieces of the following information: a scene mode of the user equipment, information about using a loaded application program by the user equipment, status information of the wearable device, capability information of the wearable device, and information detected by the wearable device; and the determining, by the user equipment according to the determined distance information or power information, a processing manner for the new message specifically includes: determining the processing manner for the new message according to the determined distance information or power information, and the determined any one or more pieces of information.

With reference to the third possible implementation manner of the first aspect of the embodiments of the present invention, in a fourth possible implementation manner of the first aspect of the embodiments of the present invention, if the determined any one or more pieces of information are the information about using the loaded application program by the user equipment, and the new message is a notification message of the application program, the determining the processing manner for the new message according to the determined distance information or power information, and the determined any one or more pieces of information specifically includes:

determining to provide an alert for the new message in the first message processing manner if the distance between the user equipment and the wearable device is greater than the preconfigured distance or a power level of the transmit signal of the user equipment is a first power level, and frequency of using the application program by the user equipment is greater than a preconfigured frequency, or determining to process the new message in the second message processing manner if frequency of using the application program by the user equipment is less than or equal to a preconfigured frequency; or determining to provide an alert for the new message in the third message processing manner if the distance between the user equipment and the wearable device is less than the preconfigured distance or a power level of the transmit signal of the user equipment is a second power level, and frequency of using the application program by the user equipment is greater than a preconfigured frequency, or determining to process the new message in the second message processing manner if frequency of using the application program by the user equipment is less than or equal to a preconfigured frequency; where a power of the transmit signal is greater than a preconfigured value when the user equipment is at the first power level, or a power of the transmit signal is less than or equal to a preconfigured value when the user equipment is at the second power level.

With reference to the first aspect or any possible implementation manner of the first to fourth possible implementation manners of the first aspect of the embodiments of the present invention, in a fifth possible implementation manner of the first aspect of the embodiments of the present invention, the method further includes:

when the wearable device and the user equipment are in a disconnected state, processing, by the user equipment, the new message in the second message processing manner if the user equipment receives the new message; and providing, by the user equipment, an alert for the new message in the third message processing manner if a quantity of times the user equipment receives the new message exceeds a preconfigured quantity of times within a preconfigured time.

With reference to the first aspect or any possible implementation manner of the first to fifth possible implementation manners of the first aspect of the embodiments of the present invention, in a sixth possible implementation manner of the first aspect of the embodiments of the present invention, the method further includes:

if the user equipment has a message that is not processed by a user, providing, by the user equipment in the third message processing manner, an alert for the message that is not processed by the user when the user equipment identifies that the wearable device is in a wireless communication range of the user equipment; or providing, by the user equipment in the first message processing manner or the third message processing manner, an alert for the message that is not processed by the user when the user equipment identifies that a wearable device of the configurable type is in a wireless communication range of the user equipment.

With reference to the sixth possible implementation manner of the first aspect of the embodiments of the present invention, in a seventh possible implementation manner of the first aspect of the embodiments of the present invention, the providing, by the user equipment in the third message processing manner, an alert for the message that is not processed by the user when the user equipment identifies that the wearable device is in a wireless communication range of the user equipment specifically includes: providing, by the user equipment, an alert for the message that is not processed by the user in the third message processing manner when the user equipment identifies that the wearable device is in the wireless communication range of the user equipment within the preconfigured time; or the providing, by the user equipment in the first message processing manner or the third message processing manner, an alert for the message that is not processed by the user when the user equipment identifies that a wearable device of the configurable type is in a wireless communication range of the user equipment specifically includes: providing, by the user equipment in the first message processing manner or the third message processing manner, an alert for the message that is not processed by the user when the user equipment identifies that the wearable device of the configurable type is in the wireless communication range of the user equipment within the preconfigured time.

With reference to the sixth or seventh possible implementation manner of the first aspect of the embodiments of the present invention, in an eighth possible implementation manner of the first aspect of the embodiments of the present invention, the providing, by the user equipment in the first message processing manner or the third message processing manner, an alert for the message that is not processed by the user specifically includes:

providing, by the user equipment in the first message processing manner, an alert for the message that is not processed by the user if the distance between the user equipment and the identified wearable device of the configurable type is greater than the preconfigured distance or the power level of the transmit signal of the user equipment is the first power level; or providing, by the user equipment in the third message processing manner, an alert for the message that is not processed by the user if the distance between the user equipment and the identified wearable device of the configurable type is less than or equal to the preconfigured distance or the power level of the transmit signal of the user equipment is the second power level.

With reference to the first aspect or any possible implementation manner of the first to eighth possible implementation manners of the first aspect of the embodiments of the present invention, in a ninth possible implementation manner of the first aspect of the embodiments of the present invention, the determining, by the user equipment, information about a distance between the user equipment and the wearable device specifically includes:

determining the information about the distance between the user equipment and the wearable device according to the power level of the transmit signal from the user equipment to the wearable device; or determining the information about the distance between the user equipment and the wearable device according to signal strength of a signal that is transmitted by the wearable device and received by the user equipment.

With reference to the ninth possible implementation manner of the first aspect of the embodiments of the present invention, in a tenth possible implementation manner of the first aspect of the embodiments of the present invention, the method further includes:

determining, by the user equipment, the power level of the transmit signal according to the signal strength of the received signal that is transmitted by the wearable device; and transmitting, by the user equipment, a signal to the wearable device according to the determined power level.

A second aspect of the embodiments of the present invention provides user equipment, including:

an information determining unit, configured to: when a wearable device and the user equipment are in a connected state, if the user equipment receives a new message, determine information about a distance between the user equipment and the wearable device; or determine power information of a transmit signal from the user equipment to the wearable device; and a message processing unit, configured to determine, according to the distance information or power information determined by the information determining unit, that a processing manner for the new message is any one or more of the following processing manners: a first message processing manner, a second message processing manner, or a third message processing manner; where the first message processing manner is sending a notification message to the wearable device, where the notification message is used to instruct the wearable device to provide an alert for a message; the second message processing manner is recording information about the new message; and the third message processing manner is providing an alert for a message by using the user equipment.

In a first possible implementation manner of the second aspect of the embodiments of the present invention, the message processing unit is specifically configured to: provide an alert for the new message in the first message processing manner or process the new message in the second message processing manner if the distance between the user equipment and the wearable device is greater than a preconfigured distance or a power level of the transmit signal of the user equipment is the first power level; or provide an alert for the new message in the third message processing manner if the distance between the user equipment and the wearable device is less than or equal to the preconfigured distance or a power level of the transmit signal of the user equipment is the second power level; where a power of the transmit signal is greater than a preconfigured value when the user equipment is at the first power level, or a power of the transmit signal is less than or equal to a preconfigured value when the user equipment is at the second power level.

With reference to the first possible implementation manner of the second aspect of the embodiments of the present invention, in a second implementation manner of the second aspect of the embodiments of the present invention, the information determining unit is further configured to determine a configuration type of the wearable device if the user equipment receives the new message; and the message processing unit is specifically configured to: process the new message in the second message processing manner if the distance between the user equipment and the wearable device is greater than the preconfigured distance or the power level of the transmit signal of the user equipment is the first power level, and the configuration type that is of the wearable device and determined by the information determining unit is a non-configurable type; or provide, by the user equipment, an alert for the new message in the first message processing manner if the distance between the user equipment and the wearable device is greater than the preconfigured distance or the power level of the transmit signal of the user equipment is the first power level, and the configuration type of the wearable device is a non-configurable type.

In a third possible implementation manner of the second aspect of the embodiments of the present invention, the information determining unit is further configured to determine any one or more pieces of the following information: a scene mode of the user equipment, information about using a loaded application program by the user equipment, status information of the wearable device, capability information of the wearable device, and information detected by the wearable device; and the message processing unit is specifically configured to determine the processing manner for the new message according to the distance information or the power information, and the any one or more pieces of information that are determined by the information determining unit.

With reference to the third possible implementation manner of the second aspect of the embodiments of the present invention, in a fourth possible implementation manner of the second aspect of the embodiments of the present invention, if the any one or more pieces of information determined by the information determining unit are the information about using the loaded application program by the user equipment, and the new message is a notification message of the application program, the message processing unit is specifically configured to: determine to provide an alert for the new message in the first message processing manner if the distance between the user equipment and the wearable device is greater than the preconfigured distance or a power level of the transmit signal of the user equipment is a first power level, and frequency of using the application program by the user equipment is greater than a preconfigured frequency, or determine to process the new message in the second message processing manner if frequency of using the application program by the user equipment is less than or equal to a preconfigured frequency; or determine to provide an alert for the new message in the third message processing manner if the distance between the user equipment and the wearable device is less than the preconfigured distance or a power level of the transmit signal of the user equipment is a second power level, and frequency of using the application program by the user equipment is greater than a preconfigured frequency, or determine to process the new message in the second message processing manner if frequency of using the application program by the user equipment is less than or equal to a preconfigured frequency; where a power of the transmit signal is greater than a preconfigured value when the user equipment is at the first power level, or a power of the transmit signal is less than or equal to a preconfigured value when the user equipment is at the second power level.

With reference to the second aspect or any possible implementation manner of the first to fourth possible implementation manners of the second aspect of the embodiments of the present invention, in a fifth possible implementation manner of the second aspect of the embodiments of the present invention, the message processing unit is further configured to: when the wearable device and the user equipment are in a disconnected state, process the new message in the second message processing manner if the user equipment receives the new message; and the message processing unit is further configured to provide an alert for the new message in the third message processing manner if a quantity of times the user equipment receives the new message exceeds a preconfigured quantity of times within a preconfigured time.

With reference to the second aspect or any possible implementation manner of the first to fifth possible implementation manners of the second aspect of the embodiments of the present invention, in a sixth possible implementation manner of the second aspect of the embodiments of the present invention, the user equipment further includes an identification unit, where the identification unit is configured to: if the user equipment has a message that is not processed by a user, when it is identified that the wearable device is in a wireless communication range of the user equipment, instruct the message processing unit to provide, in the third message processing manner, an alert for the message that is not processed by the user; or the identification unit is configured to: if the user equipment has a message that is not processed by a user, when it is identified that a wearable device of the configurable type is in a wireless communication range of the user equipment, instruct the message processing unit to provide, in the first message processing manner or in the third message processing manner, an alert for the message that is not processed by the user.

With reference to the sixth possible implementation manner of the second aspect of the embodiments of the present invention, in a seventh possible implementation manner of the second aspect of the embodiments of the present invention, the identification unit is specifically configured to: when it is identified that the wearable device is in the wireless communication range of the user equipment within the preconfigured time, instruct the message processing unit to provide, in the third message processing manner, an alert for the message that is not processed by the user; or the identification unit is specifically configured to: when it is identified that the wearable device of the configurable type is in the wireless communication range of the user equipment within the preconfigured time, instruct the message processing unit to provide, in the first message processing manner or in the third message processing manner, an alert for the message that is not processed by the user.

With reference to the sixth or seventh possible implementation manner of the second aspect of the embodiments of the present invention, in an eighth possible implementation manner of the second aspect of the embodiments of the present invention, the identification unit is specifically configured to: instruct the message processing unit to provide, in the first message processing manner, an alert for the message that is not processed by the user if the distance between the user equipment and the identified wearable device of the configurable type is greater than the preconfigured distance or the power level of the transmit signal of the user equipment is the first power level; or instruct the message processing unit to provide, in the third message processing manner, an alert for the message that is not processed by the user if the distance between the user equipment and the identified wearable device of the configurable type is less than or equal to the preconfigured distance or the power level of the transmit signal of the user equipment is the second power level.

With reference to the second aspect or any possible implementation manner of the first to eighth possible implementation manner of the second aspect of the embodiments of the present invention, in a ninth possible implementation manner of the second aspect of the embodiments of the present invention, the information determining unit is specifically configured to determine the information about the distance between the user equipment and the wearable device according to the power level of the transmit signal from the user equipment to the wearable device, or determine the information about the distance between the user equipment and the wearable device according to signal strength of a received signal that is transmitted by the wearable device.

With reference to the ninth possible implementation manner of the second aspect of the embodiments of the present invention, in a tenth possible implementation manner of the second aspect of the embodiments of the present invention, the user equipment further includes:

a level determining unit, configured to determine the power level of the transmit signal according to the signal strength of the received signal that is transmitted by the wearable device; and a signal transmission unit, configured to transmit a signal to the wearable device according to a power level determined by the level determining unit.

A third aspect of the embodiments of the present invention provides a message processing system, including user equipment and a wearable device, where the user equipment is the user equipment according to the second aspect or any possible implementation manner of the first to tenth possible implementation manners of the second aspect of the embodiments of the present invention, and the wearable device is configured to receive a notification message sent by the user equipment to provide an alert for the new message received by the user equipment.

In the embodiments, when user equipment receives a new message, the user equipment determines, according to a status of a communication connection to a wearable device and distance information (or power information of a transmit signal of the user equipment), to determine to use which manner for performing reminding or processing on the new message. In this way, both the information about the distance between the user equipment and the wearable device and the power information can reflect an actual location status between the user equipment and the wearable device, and the user equipment processes the new message according to the actual location status between the user equipment and the wearable device; in addition, the wearable device is carried by a user. Therefore, the user equipment performs particular processing on the new message according to an actual location of the user, and it is ensured that the user can learn that the user equipment receives the new message when the user is in a wireless communication range of the user equipment, and it is not required to provide an alert for the new message when the user leaves the wireless communication range of the user equipment, which can reduce power consumption.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The embodiments of the disclosure are described below with reference to the accompanying drawings.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
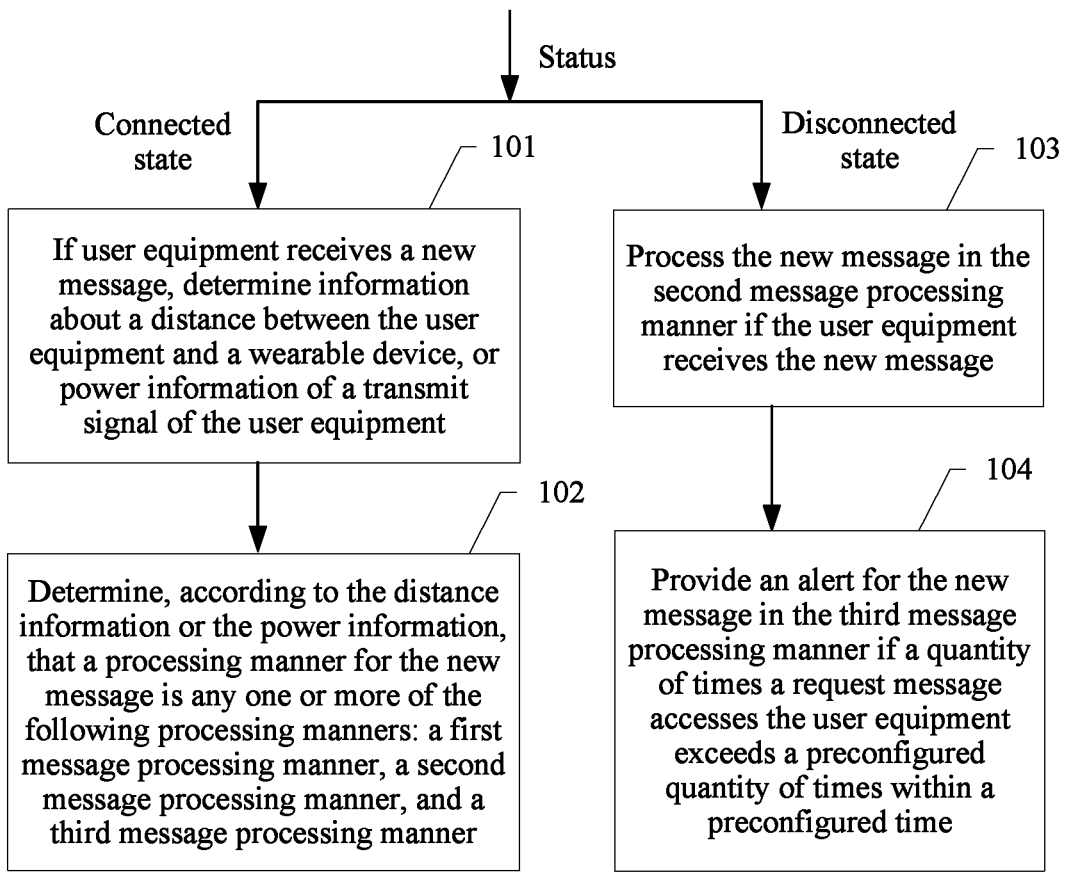
FIG. 1 is a flowchart of a message processing method according to an embodiment of the present invention.
Figure 2:
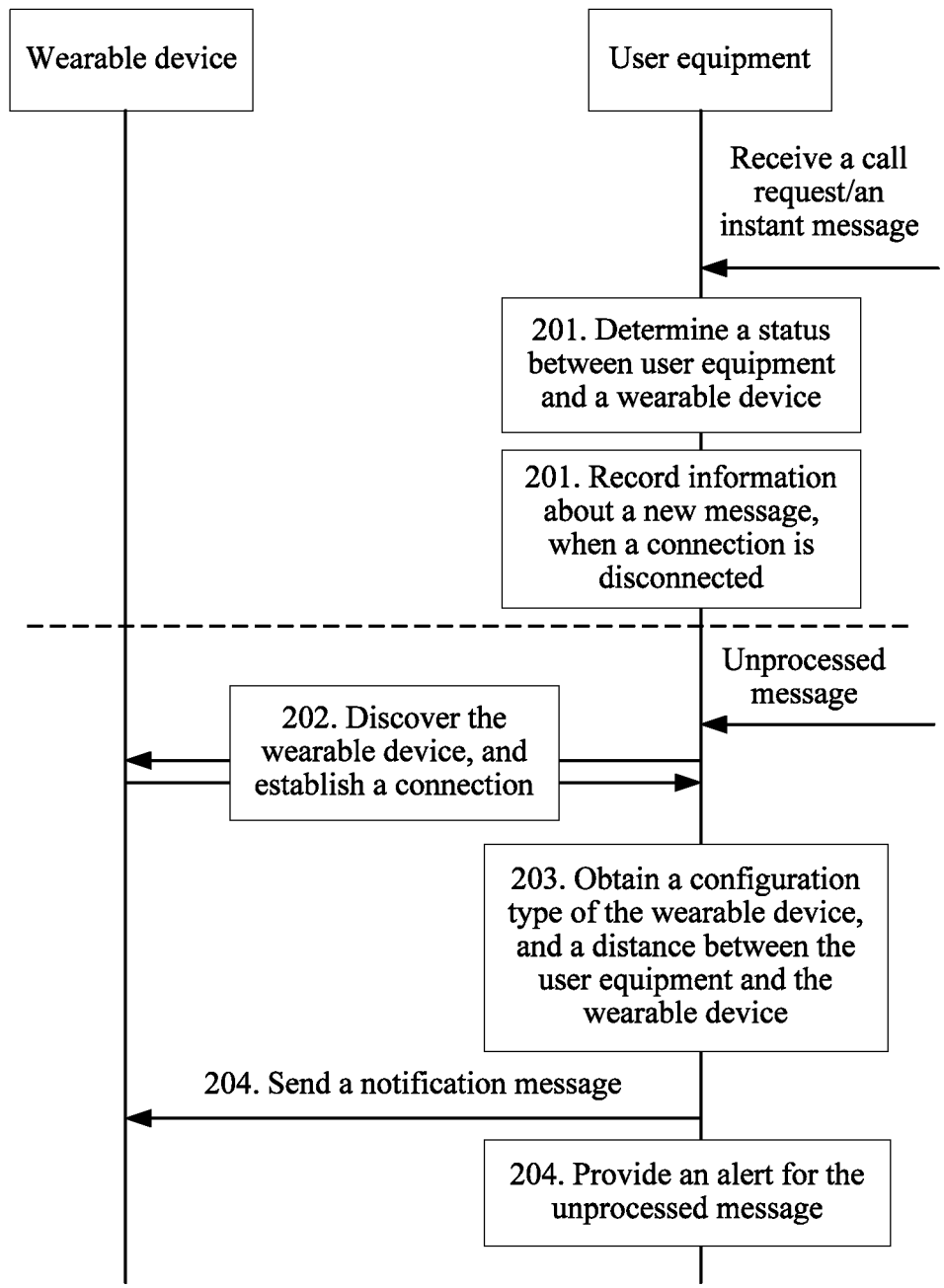
FIG. 2 is a flowchart of a message processing method according to an application embodiment of the present invention.
Figure 3:
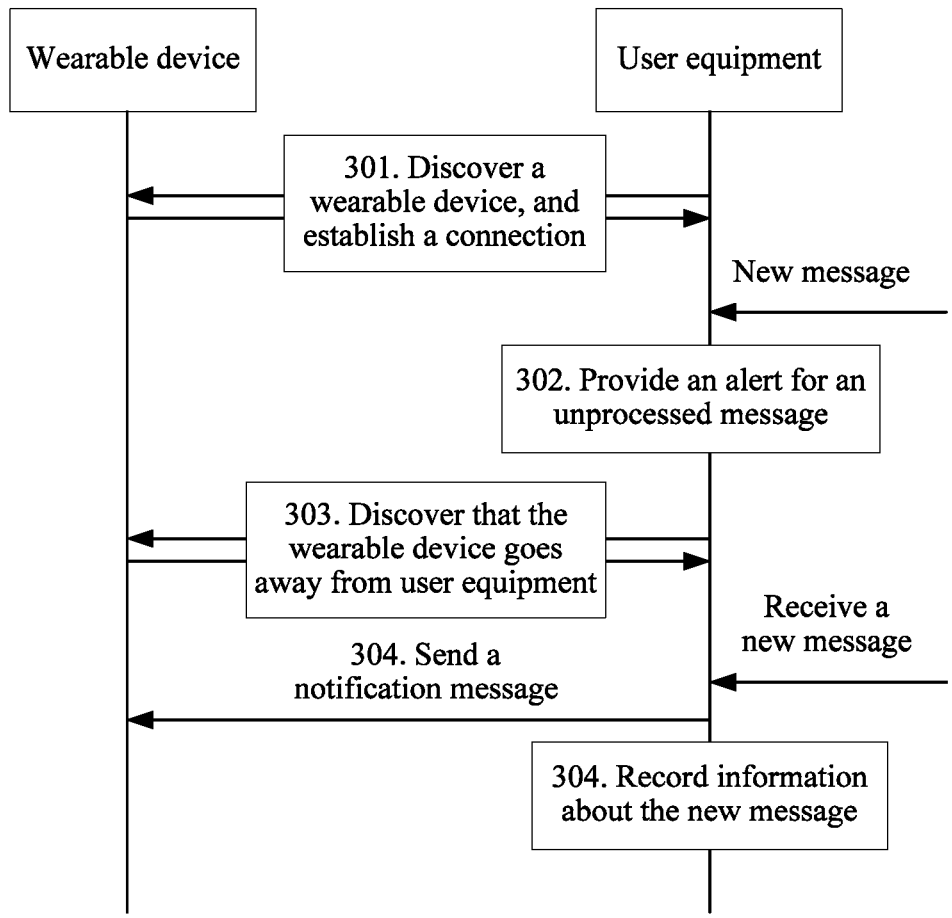
FIG. 3 is a flowchart of another message processing method according to an application embodiment of the present invention.

An embodiment of the present invention provides a message processing method, mainly applied to a communications system that includes user equipment and a wearable device. Generally, communication connection is performed between the user equipment and the wearable device by using a wireless communications protocol (such as Bluetooth). The method in this embodiment is a method executed by the user equipment in the system, as shown in FIG. 1, and includes:

Step 101: When the wearable device and the user equipment are in a connected state, if the user equipment receives a new message, the user equipment determines information about a distance between the user equipment and the wearable device, or determines power information of a transmit signal from the user equipment to the wearable device. The new message is a message that is currently received by the user equipment and may include a request message, or is a message that needs to be viewed and processed by a user, such as an instant message or an SMS message. In addition, the distance information and the power information that are determined by the user equipment are complementary to each other, that is, a larger power of the transmit signal of the user equipment indicates a longer distance between the user equipment and the wearable device.

It may be understood that, the user equipment connects to the wearable device by using the wireless communications protocol (such as a Bluetooth protocol or a WiFi communications protocol). The Bluetooth protocol is used as an example for description. The user equipment may periodically send a Bluetooth search (Search) message at a power level to discover a wearable device in a Bluetooth communication range. The Bluetooth search message may include power information that is of a transmit signal of the user equipment and corresponds to the power level. When the user equipment receives a Bluetooth response message returned by the wearable device, after the user equipment is paired to the wearable device, a communication connection of the foregoing power level may be established between the user equipment and the wearable device. In this way, the user equipment and the wearable device are in the connected state, and the user equipment stores a Bluetooth address and device information of the wearable device, which includes attribute information indicating whether the wearable device is configurable, and the like. If a user carrying the wearable device leaves a valid range of Bluetooth communication performed by the user equipment, the user equipment and the wearable device are in a disconnected state.

Generally, the user equipment first sends the foregoing Bluetooth search message at a lowest power level, so that power consumption of the user equipment can be reduced. In addition, one power level corresponds to one transmission distance level of Bluetooth communication performed by the user equipment. For example, a power level of 1 mW (0 dBm) to 100 mW (20 dBm) of a transmit power of user equipment may correspond to a transmission distance level of 100 m; a power level of 0.25 mW (−6 dBm) to 2.5 mW (4 dBm) of a transmit power of user equipment may correspond to a transmission distance level of 10 m; a power level of less than or equal to 1 mW (0 dBm) of a transmit power of user equipment may correspond to a transmission distance level of 1 m to 2 m. In this embodiment, the user equipment can determine the information about the distance between the user equipment and the wearable device according to the power level of the transmit signal from the user equipment to the wearable device, or can determine the information about the distance between the user equipment and the wearable device according to signal strength of a signal that is transmitted by the wearable device and received by the user equipment.

The foregoing user equipment may be a device having a wireless connection function, such as a smartphone or a tablet computer, and the wearable device may be a device having the wireless connection function, such as a smart band, a watch, or glasses.

Step 102: The user equipment determines, according to the distance information or power information determined in the foregoing step 101, that a processing manner for the new message is any one or more of the following processing manners: a first message processing manner, a second message processing manner, or a third message processing manner. The first message processing manner is sending a notification message to the wearable device, where the notification message is used to instruct the wearable device to provide an alert for a message, for example, the wearable device reminds a user in a manner of vibration or a sound. The second message processing manner is only recording information about the new message, for example, recording information such as a time at which the user equipment receives the new message, or some simple content included in the new message, instead of alerting a user in a manner of vibration or a sound, so that power consumption of the user equipment and the like can be reduced. The third message processing manner is providing an alert for a message by using the user equipment, for example, alerting a user in a manner of vibration or a sound.

In addition, when the wearable device or the user equipment provides an alert for the message, a notification is made mainly in two manners: One is a manner of vibration or a sound for alerting a user, the other is a manner of screen-on or a breathing light for alerting a user, where reminding in this manner can avoid affecting another user.

Specifically, if the distance between the user equipment and the wearable device is greater than a preconfigured distance, or the power level of the transmit signal of the user equipment is a first power level, it indicates that the user carries the wearable device at a relatively long distance from the user equipment, and the user equipment provides an alert for the new message in the first message processing manner, or the user equipment processes the new message in the second message processing manner. For example, if the distance between the user equipment and the wearable device is 5 m, a corresponding power level of the transmit signal of the user equipment is a power level of 0.25 mW (−6 dBm) to 2.5 mW (4 dBm), and the new message is processed in the first message processing manner or the second message processing manner.

It may be understood that, if the distance between the user equipment and the wearable device is less than or equal to a preconfigured distance, or the power level of the transmit signal of the user equipment is a second power level, it indicates that the user carries the wearable device at a relatively short distance from the user equipment, and in this case, the user equipment can directly provide an alert for the new message in the third message processing manner. A power of the transmit signal is greater than a preconfigured value when the user equipment is at the first power level, for example, user equipment is at a power level of 0.25 mW (−6 dBm) to 2.5 mW (4 dBm) when a power of a transmit signal of the user equipment is greater than 1 mW and less than 2.5 mW. A power of the transmit signal is less than or equal to a preconfigured value when the user equipment is at the second power level, for example, user equipment is at a power level of less than or equal to 1 mW (0 dBm) when a power of a transmit signal of the user equipment is less than 1 mW.

In a specific embodiment, when the wearable device and the user equipment are in the disconnected state, it indicates that the user carrying the wearable device leaves the valid range of the Bluetooth communication performed by the user equipment; if the user equipment receives the new message, the user equipment executes step 103, that is, processes the new message in the second message processing manner. In this case, if a quantity of times the user equipment receives the new message exceeds a preconfigured quantity of times within a preconfigured time, the user equipment executes step 104, that is, provides an alert for the new message in the third message processing manner. In this way, the user may be prevented from missing processing some important requests. For example, a user leaves a mobile phone at home; if multiple incoming calls are frequently received, after user equipment provides an alert for the calls in a third message processing manner, the user's family member may help answer the calls.

It can be learned that, in this embodiment, when user equipment receives a new message, the user equipment determines, according to a status of a communication connection to a wearable device and distance information (or power information of a transmit signal of the user equipment), to determine to use which manner for performing reminding or processing on the new message. In this way, both the information about the distance between the user equipment and the wearable device and the power information can reflect an actual location status between the user equipment and the wearable device, and the user equipment processes the new message according to the actual location status between the user equipment and the wearable device; in addition, the wearable device is carried by a user. Therefore, the user equipment performs particular processing on the new message according to an actual location of the user, and it is ensured that the user can learn that the user equipment currently receives the new message when the user is in a wireless communication range of the user equipment, and it is not required to provide an alert for the new message when the user leaves the wireless communication range of the user equipment, which can reduce power consumption.

In a specific embodiment, when the wearable device and the user equipment are in the connected state, if the user equipment receives the new message, the user equipment not only needs to determine information about the distance between the user equipment and the wearable device, and the power information, but also needs to determine a configuration type of the wearable device. Then, when the user equipment further executes the foregoing step 102, the user equipment processes the new message in the second message processing manner if the distance between the user equipment and the wearable device is greater than the preconfigured distance (or the power level of the transmit signal of the user equipment is the first power level), and the configuration type of the wearable device is a non-configurable type; or the user equipment processes the new message in the first message processing manner only if the distance between the user equipment and the wearable device is greater than the preconfigured distance (or the power level of the transmit signal of the user equipment is the first power level), and the configuration type of the wearable device is a configurable type. This prevents a case in which a notification message is indiscriminately sent to the wearable device but the wearable device cannot provide an alert for the new message.

The wearable device is classified into a device of a configurable type and a non-configurable type according to whether the wearable device can be configured by the user equipment. A wearable device of the configurable type can receive a control instruction from the user equipment, and execute a series of operations according to the control instruction. A wearable device of the non-configurable type cannot execute a control instruction sent by the user equipment. However, the wearable device has a specific function such as a heart rate count function or a step count function, then reports data to the user equipment by using a wireless connection manner between the wearable device and the user equipment. In this embodiment, the user equipment may obtain the configuration type of the wearable device from the attribute information of the wearable device.

In another specific embodiment, the user equipment can not only execute the foregoing step 101, but also determine any one or more pieces of the following information: a scene mode (including a conference mode, a home mode, a power saving mode, or the like) of the user equipment; information (frequency of use) about using a loaded application program by the user equipment, where the foregoing distance information together with the use information mainly determines a processing manner for a notification message of the application program; status information of the wearable device; capability information of the wearable device; or information (such as motion detection information, sleep detection information, or health detection information of a user) detected by the wearable device. In this way, when executing the foregoing step 102, the user equipment determines the processing manner for the new message according to the determined distance information or power information, and the foregoing determined any one or more pieces of information.

For example, if the foregoing determined any one or more pieces of information are the information about using the loaded application program by the user equipment, and the new message is a notification message of the application program, it is determined to provide an alert for the new message in the first message processing manner if the distance between the user equipment and the wearable device is greater than the preconfigured distance (or the power level of the transmit signal of the user equipment is the first power level), and frequency of using the application program by the user equipment is greater than a preconfigured frequency, or it is determined to process the new message in the second message processing manner if frequency of using the application program by the user equipment is less than or equal to a preconfigured frequency; or it is determined to provide an alert for the new message in the third message processing manner if the distance between the user equipment and the wearable device is less than the preconfigured distance (or the power level of the transmit signal of the user equipment is the second power level), and frequency of using the application program by the user equipment is greater than a preconfigured frequency, or it is determined to process the new message in the second message processing manner if frequency of using the application program by the user equipment is less than or equal to a preconfigured frequency.

It should be noted that, in the foregoing step 101 to step 104, when the user equipment and the wearable device are in the disconnected state, or when the user equipment and the wearable device are in the connected state and the wearable device is of the non-configurable type, the user equipment performs processing in the second message processing manner, that is, does not provide an alert for the new message but only records information about the new message. Consequently, the new message is not processed in time by the user. In this case, if the user equipment has a message that is not processed by a user, including an unprocessed request message, an unprocessed network instant message or SMS message, or the like, when the user equipment identifies that a wearable device is in the wireless communication range of the user equipment, it indicates that the user carrying the wearable device enters the wireless communication range, and the user equipment provides, in the third message processing manner, an alert for the message that is not processed by the user, that is, directly provides, by using the user equipment, an alert for the message that is not processed by the user, to remind the user to process, in time, the message that is not processed.

Alternatively, the user equipment may provide, in the first message processing manner or the third message processing manner, an alert for the message that is not processed by the user when the user equipment identifies that a wearable device of the configurable type is in the wireless communication range of the user equipment. The user equipment can further determine the information about the distance between the user equipment and the wearable device (for example, the distance information is determined according to a power level that is used when the user equipment communicates with the wearable device) or the power information of the transmit signal from the user equipment to the wearable device. The user equipment provides, in the first message processing manner, an alert for the message that is not processed by the user if it is learned, according to the determined distance information, that the distance between the user equipment and the wearable device is greater than the preconfigured distance or the power level of the transmit signal of the user equipment is the first power level. The user equipment provides, in the third message processing manner, an alert for the message that is not processed by the user if the distance between the user equipment and the wearable device is less than or equal to the preconfigured distance or the power level of the transmit signal of the user equipment is the second power level.

Further, to prevent the user equipment from incorrectly performing processing or reminding on the message that is not processed by the user because the user carrying the wearable device temporarily enters the wireless communication range of the user equipment, the user equipment needs to provide, in the first message processing manner or the third message processing manner, an alert for the message that is not processed by the user only when determining that it is relatively stable that the user carrying the wearable device enters the wireless communication range of the user equipment. Specifically, the user equipment provides, in the third message processing manner, an alert for the message that is not processed by the user if the user equipment identifies that the wearable device is in the wireless communication range of the user equipment within the preconfigured time; the user equipment provides, in the first message processing manner or the third message processing manner, an alert for the message that is not processed by the user if the user equipment identifies that the wearable device of the configurable type is in the wireless communication range of the user equipment within the preconfigured time.

In addition, it should be noted that, the user equipment can not only execute the foregoing methods, but also switch the power level of the transmit signal of the user equipment according to a status of a signal received from the wearable device. Specifically, the user equipment determines the power level of the transmit signal according to signal strength of a received signal that is transmitted by the wearable device, and transmits a signal to the wearable device according to the determined power level.

The following uses a specific application example to describe message processing methods provided in embodiments of the present invention. In these embodiments, user equipment and a wearable device communicates with each other by using a Bluetooth protocol, and details are as follows:

Embodiment 1

Step 201: When user equipment receives a new message, for example, when the user equipment currently receives a call request message, or has an instant message or an SMS message, the user equipment determines a status between the user equipment and the wearable device, and if the status is a disconnected state, the user equipment does not remind a user in a manner of vibration or a sound, but directly records information about the new message, for example, recording access information (peer end information of a call) of the call request message, or recording information about the instant message, or the SMS message.

It may be understood that, if the status is a connected state, the user equipment may provide an alert for the new message according to a distance between the user equipment and the wearable device, and a configuration status of the wearable device. For a specific remind manner, refer to the foregoing embodiment, and details are not described herein.

Step 202: The user equipment periodically uses a Bluetooth search message at a power level to discover a wearable device that enters a Bluetooth communication range of the user equipment. Specifically, the user equipment periodically sends the Bluetooth search message according to a transmit power (a transmit power less than or equal to 1 mW) at the power level, and if a Bluetooth response message returned by the wearable device is received, determines that the wearable device enters the Bluetooth communication range of the user equipment.

The user equipment establishes a communication connection with the wearable device. If the user equipment determines that the user equipment has stored information about the wearable device, it indicates that the wearable device previously has been paired to and connected to the user equipment, and when the user equipment receives the Bluetooth response message from the wearable device, the user equipment has established a connection with the wearable device. If the information about the wearable device is not stored, the user equipment needs to be paired to and establish a connection with the wearable device.

Step 203: For a message that is not processed by a user, that is, the new message recorded by the user equipment in the foregoing step 201, the user equipment first obtains a configuration type of the wearable device from a Generic Attribute Profile (Generic Attribute Profile, GATT) of the wearable device, and the user equipment determines, according to the power level used in a process of discovering the wearable device in the foregoing step 202, that a distance between the user equipment and the wearable device is 1 m to 2 m.

Step 204: The user equipment provides, in a manner of a sound, vibration, screen-on, or a flashing light, an alert for the message that is not processed by the user if the distance between the user equipment and the wearable device is in the vicinity of 1 m to 2 m within a particular time (such as 5 s to 10 s) and the configuration type of the wearable device is a non-configurable type; or the user equipment may send a notification message to the wearable device if the wearable device is of a configurable type, so that the wearable device provides, in a manner of a sound, vibration, screen-on, or a flashing light, an alert for the message that is not processed by the user, and the user processes, in time, the message that is not processed by the user.

Embodiment 2

Step 301: User equipment uses a Bluetooth search message at a power level to discover a wearable device that enters a Bluetooth communication range of the user equipment. Specifically, the user equipment periodically sends the Bluetooth search message according to a transmit power (a transmit power less than or equal to 1 mW) at the power level, and if a Bluetooth response message returned by the wearable device is received, determines that the wearable device enters the Bluetooth communication range of the user equipment.

Step 302: When the user equipment receives a new message, the user equipment determines, according to the power level in step 301, that a distance between the user equipment and the wearable device is a distance of 1 m to 2 m, and the user equipment directly provides an alert for the new message in a manner of a sound, vibration, or screen-on.

Step 303: In a process in which the user equipment communicates the wearable device, if signal strength of a signal, received by the user equipment, of the wearable device weakens, it indicates that a user carrying the wearable device is going away from the user equipment, and in order to maintain a communication connection with the wearable device, the user equipment switches to a transmit power (a transmit power of 0.25 mW to 2.5 mW) of another power level to send a signal to the wearable device at a larger transmit power.

Step 304: When the user equipment receives a new message again, the user equipment determines, according to the power level in step 303, that the distance between the user equipment and the wearable device is a distance of about 10 m, and if the wearable device is of a configurable type, the user equipment sends a notification message to the wearable device, so that the wearable device directly provides an alert for the new message in a manner of a sound, vibration, screen-on, or a flashing light.

The user equipment only records information about the new message if the wearable device is of a non-configurable type.

Embodiment 3

User equipment may use different message processing manners according to a scene mode of the user equipment, and a distance between the user equipment and a wearable device:

(1) When the user equipment automatically adjust the user equipment to a conference mode according to a user setting, or according to information such as a schedule, a mail reminder, and time recorded on the user equipment, if the user equipment receives an incoming call or another notification message, the user equipment determines the distance between the user equipment and the wearable device according to a power level of a transmit signal or strength of a received signal; when the distance between the user equipment and the wearable device is greater than a preconfigured distance, the user equipment may use a first message processing manner, so that the wearable device initiates message alert to a user; or when the distance between the user equipment and the wearable device is less than a preconfigured distance, the user equipment may use a first message processing manner according to a current scene mode of the user equipment, that is, "the conference mode", which means that it is inconvenient for the user to answer the call or process the notification message, so that the wearable device initiates message alert to a user.

(2) When the user equipment automatically adjust the user equipment to a home mode according to a user setting, or according to information such as a Wi-Fi service set identifier (Service Set Identifier, SSID), a cell identifier (Cell-ID), and time of the user equipment, the user equipment determines the distance between the user equipment and the wearable device according to a power level of a transmit signal or strength of a received signal; when the user equipment is disconnected from the wearable device, in this case, if the user equipment receives an incoming call or another notification message, the user equipment uses a third message processing manner according to a current scene mode of the user equipment, that is, "the home mode", which means that the user equipment is in a home environment, and when an incoming call is received, a user (that is, a user carrying the wearable device) is not near the user equipment, and the user's family member can help the user answer the incoming call, so that the user equipment initiates message alert to the user.

(3) When the user equipment automatically adjust the user equipment to a power saving mode according to a user setting, or according to a battery level status of the user equipment, if the user equipment receives an incoming call or another notification message, the user equipment determines the distance between the user equipment and the wearable device according to a power level of a transmit signal or strength of a received signal; when the distance between the user equipment and the wearable device is greater than a preconfigured distance, the user equipment uses a first message processing manner, so that the wearable device initiates message alert to a user; or when the distance between the user equipment and the wearable device is less than a preconfigured distance, the user equipment uses a first message processing manner according to a current scene mode, that is, "the power saving mode", so that the wearable device initiates message alert to a user.

Embodiment 4

User equipment may use different message processing manners according to information about using an application program loaded on the user equipment (for example, information such as frequency of using a social program, a mail, or an instant messaging program), and a distance between the user equipment and a wearable device:

When the user equipment receives a notification message of the application program, the user equipment determines the distance between the user equipment and the wearable device according to a power level of a transmit signal or strength of a received signal; when the distance between the user equipment and the wearable device is greater than a preconfigured distance, if frequency of using the application program by the user equipment is relatively high, the user equipment uses a first message processing manner, so that the wearable device initiates message alert to a user, for example, the wearable device reminds the user in a manner of vibration, a sound, screen-on, or a flashing light; or if frequency of using the application program by the user equipment is relatively low, the user equipment uses a second message processing manner to record the notification message.

When the distance between the user equipment and the wearable device is less than a preconfigured distance, if frequency of using the application program by the user equipment is relatively high, the user equipment uses a third message processing manner, so that the user equipment initiates message alert to a user, for example, the wearable device reminds the user in a manner of vibration, a sound, screen-on, or a flashing light; or if frequency of using the application program by the user equipment is relatively low, the user equipment uses a second message processing manner to record the notification message.

Embodiment 5

User equipment may use different message processing manners according to information (including attribute information, collected information, and the like) about a wearable device, and a distance between the user equipment and the wearable device:

(1) The user equipment may use different message processing manners according to battery level information of the wearable device, and the distance between the user equipment and the wearable device:

if the user equipment receives an incoming call or another notification message, the user equipment determines the distance between the user equipment and the wearable device according to a power level of a transmit signal or strength of a received signal; when the distance between the user equipment and the wearable device is greater than a preconfigured distance, the user equipment obtains the battery level information of the wearable device, and when a battery level of the wearable device is less than a preset battery level value, the user equipment uses a third message processing manner, so that the user equipment initiates message alert to a user; or when a battery level of the wearable device is greater than a preset battery level value, the user equipment uses a first message processing manner, so that the wearable device initiates message alert to a user.

(2) The user equipment uses different message processing manners according to capability information of the wearable device, and the distance between the user equipment and the wearable device:

if the user equipment receives an incoming call or another notification message, the user equipment determines the distance between the user equipment and the wearable device according to a power level of a transmit signal or strength of a received signal; when the distance between the user equipment and the wearable device is greater than a preconfigured distance, the user equipment obtains the capability information of the wearable device, including an audio output capability, a displaying capability, and the like, and then may use a first message processing manner, so that the wearable device initiates message alert to a user, which is specifically reminding the user in a manner of vibration, screen-on, or the like; or use both a first message processing manner and a third message processing manner, so that the wearable device makes an alert sound to prompt a user and the user equipment initiates message alert to a user.

(3) The user equipment uses different message processing manners according to collected information (such as motion detection information, sleep detection information, and health detection information of a user) of the wearable device, and the distance between the user equipment and the wearable device:

if the user equipment receives an incoming call or another notification message, the user equipment determines the distance between the user equipment and the wearable device according to a power level of a transmit signal or strength of a received signal; when the distance between the user equipment and the wearable device is greater than a preconfigured distance, the user equipment obtains user status information detected by the wearable device, and if the user equipment is in a deep sleep state, the user equipment uses a second message processing manner, so that the user equipment records a message; if there are multiple incoming calls from a same within a particular time range, the user equipment switches to using a first message processing manner, so that the wearable device initiates message alert to a user; if the user equipment is in a light sleep state, the user equipment uses a first message processing manner, so that the wearable device initiates message alert to a user; or when the distance between the user equipment and the wearable device is less than a preconfigured distance, the user equipment obtains the user status information detected by the wearable device; if the user equipment is in a deep sleep state, the user equipment uses a second message processing manner, so that the user equipment records a message; if there are multiple incoming calls from a same number within a particular time range, the user equipment switches to using a third message processing manner, so that the user equipment initiates message alert to a user; or if the user equipment is in a light sleep state, the user equipment uses a third message processing manner, so that the user equipment initiates message alert to a user.

Figure 4:
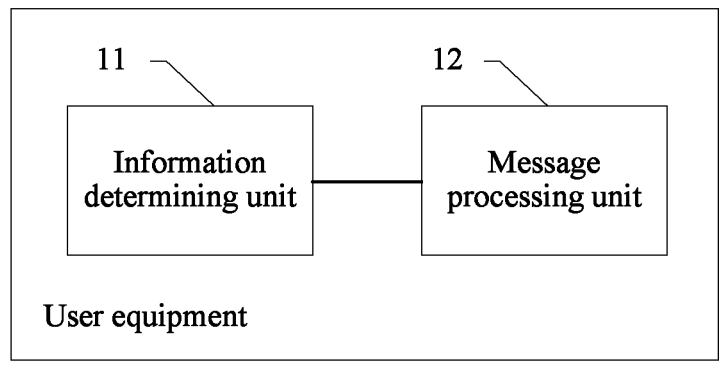
FIG. 4 is a schematic structural diagram of user equipment according to an embodiment of the present invention.

An embodiment of the present invention further provides user equipment. A schematic structural diagram of the user equipment is shown in FIG. 4, and the user equipment includes:

an information determining unit 11, configured to: when a wearable device and user equipment are in a connected state, if the user equipment receives a new message, determine information about a distance between the user equipment and the wearable device; or determine power information of a transmit signal from the user equipment to the wearable device. Specifically, when determining the distance information, the information determining unit 11 is configured to: determine the information about the distance between the user equipment and the wearable device according to a power level of the transmit signal from the user equipment to the wearable device, or determine the information about the distance between the user equipment and the wearable device according to signal strength of a received signal that is transmitted by the wearable device; and a message processing unit 12, configured to determine, according to the distance information or power information determined by the information determining unit 11, that a processing manner for the new message is any one or more of the following processing manners: a first message processing manner, a second message processing manner, or a third message processing manner.

The first message processing manner is sending a notification message to the wearable device, where the notification message is used to instruct the wearable device to provide an alert for a message; the second message processing manner is recording information about the new message; and the third message processing manner is providing an alert for a message by using the user equipment. In addition, when the wearable device or the user equipment provides an alert for the message, a notification is made mainly in two manners: One is a manner of vibration or a sound for alerting a user, the other is a manner of screen-on or a breathing light for alerting a user, where reminding in this manner can avoid affecting another user.

In a specific embodiment, the message processing unit 12 is specifically configured to provide an alert for the new message in the first message processing manner or process the new message in the second message processing manner if the distance between the user equipment and the wearable device is greater than a preconfigured distance or a power level of the transmit signal of the user equipment is the first power level; or provide an alert for the new message in the third message processing manner if the distance between the user equipment and the wearable device is less than or equal to the preconfigured distance or a power level of the transmit signal of the user equipment is the second power level; where a power of the transmit signal is greater than a preconfigured value when the user equipment is at the first power level, or a power of the transmit signal is less than or equal to a preconfigured value when the user equipment is at the second power level.

Further, the foregoing information determining unit 11 not only can determine the distance information or the power information between the user equipment and the wearable device when receiving the new message, but also is configured to determine a configuration type of the wearable device if the user equipment receives the new message. In this case, the foregoing message processing unit 12 is specifically configured to: process the new message in the second message processing manner if the distance between the user equipment and the wearable device is greater than the preconfigured distance (or the power level of the transmit signal of the user equipment is the first power level), and the configuration type that is of the wearable device and determined by the information determining unit 11 is a non-configurable type; or provide an alert for the new message in the first message processing manner if the distance between the user equipment and the wearable device is greater than the preconfigured distance (or the power level of the transmit signal of the user equipment is the first power level), and the configuration type of the wearable device is a non-configurable type.

Figure 5:
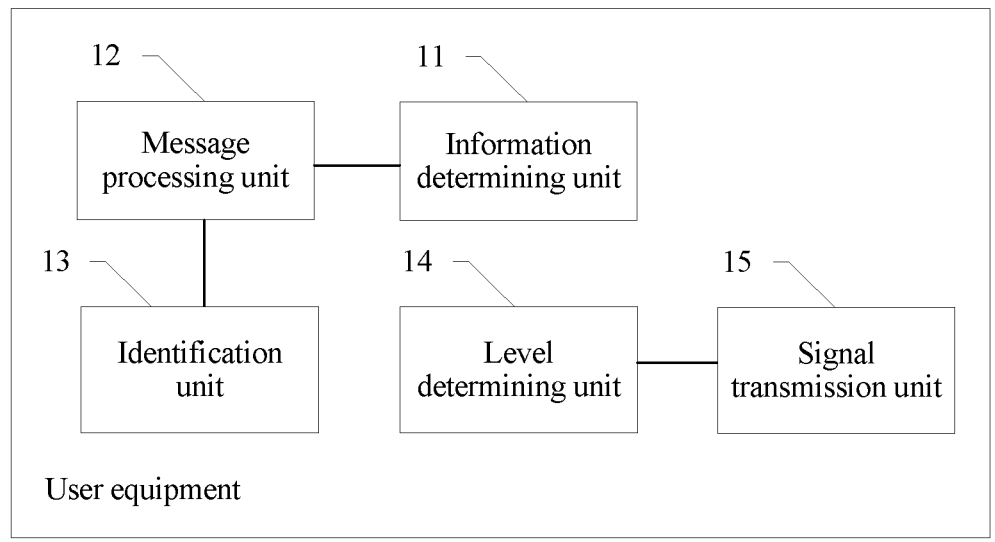
FIG. 5 is a schematic structural diagram of another user equipment according to an embodiment of the present invention.

Referring to FIG. 5, in a specific embodiment, in addition to including the structure shown in FIG. 4, the user equipment may further include an identification unit 13, a level determining unit 14, and a signal transmission unit 15.

In a specific embodiment, the message processing unit 11 is further configured to: when the wearable device and the user equipment are in a disconnected state, process the new message in the second message processing manner if the user equipment receives the new message. In this case, the message processing unit 12 is further configured to provide an alert for the new message in the third message processing manner if a quantity of times the user equipment receives the new message exceeds a preconfigured quantity of times within a preconfigured time.

The identification unit 13 is configured to: if the user equipment has a message that is not processed by a user, when it is identified that the wearable device is in a wireless communication range of the user equipment, instruct the message processing unit 12 to provide, in the third message processing manner, an alert for the message that is not processed by the user; or the identification unit 13 is configured to: if the user equipment has a message that is not processed by a user, when it is identified that a wearable device of a configurable type is in a wireless communication range of the user equipment, instruct the message processing unit 12 to provide, in the first message processing manner or in the third message processing manner, an alert for the message that is not processed by the user. The identification unit 13 can further determine the information about the distance between the user equipment and the wearable device (for example, determine the distance information according to a power level used when the user equipment communicates with the wearable device) or the power information of the transmit signal from the user equipment to the wearable device, and instruct the message processing unit 12 to provide, in the first message processing manner, an alert for the message that is not processed by the user if it is learned, according to the determined distance information, that the distance between the user equipment and the wearable device is greater than a preconfigured distance, or the power level of the transmit signal of the user equipment is the first power level; or instruct the message processing unit 12 to provide, in the third message processing manner, an alert for the message that is not processed by the user if the distance between the user equipment and the wearable device is less than or equal to a preconfigured distance according to the determined distance information, or the power level of the transmit signal of the user equipment is the second power level.

In order to prevent the user equipment from incorrectly performing processing or providing an alert for the message that is not processed by the user because the user carrying the wearable device temporarily enters the wireless communication range of the user equipment, the identification unit 13 is specifically configured to, when it is identified that the wearable device is in the wireless communication range of the user equipment within a preconfigured time, instruct the message processing unit 12 to provide, in the third message processing manner, an alert for the message that is not processed by the user; or the identification unit 13 is specifically configured to, when it is identified that the wearable device of the configurable type is in the wireless communication range of the user equipment within a preconfigured time, instruct the message processing unit 11 to provide, in the first message processing manner or in the third message processing manner, an alert for the message that is not processed by the user.

The level determining unit 14 is configured to determine the power level of the transmit signal according to the signal strength of the received signal that is transmitted by the wearable device.

The signal transmission unit 15 is configured to transmit a signal to the wearable device according to a power level determined by the level determining unit 14.

It can be learned that, in this embodiment of the user equipment, when the user equipment receives a new message, a message processing unit 12 determines, according to a status of a communication connection between the user equipment and a wearable device and distance information, to determine to use which manner for providing an alert for or processing the new message. In this way, both the information about the distance between the user equipment and the wearable device and the power information can reflect an actual location status between the user equipment and the wearable device, and the user equipment processes the new message according to the actual location status between the user equipment and the wearable device; in addition, the wearable device is carried by a user. Therefore, the user equipment performs particular processing on the new message according to an actual location of the user, and it is ensured that the user can learn that the user equipment receives the new message when the user is in a wireless communication range of the user equipment, and it is not required to provide an alert for the new message when the user leaves the wireless communication range of the user equipment, which can reduce power consumption.

Further, in another specific embodiment, the foregoing information determining unit 11 not only can determine the information about the distance between the user equipment and the wearable device or the power information when receiving the new message, but also is configured to determine any one or more pieces of the following information: a scene mode of the user equipment, information about using a loaded application program by the user equipment, status information of the wearable device, capability information of the wearable device, and information detected by the wearable device. The message processing unit 12 is specifically configured to determine the processing manner for the new message according to the distance information or the power information, and the any one or more pieces of information that are determined by the information determining unit 11.

For example, if the any one or more pieces of information determined by the information determining unit 11 are the information about using the loaded application program by the user equipment and the new message is a notification message of the application program, the message processing unit 12 is specifically configured to: determine to provide an alert for the new message in the first message processing manner if the distance between the user equipment and the wearable device is greater than the preconfigured distance (or a power level of the transmit signal of the user equipment is the first power level), and frequency of using the application program by the user equipment is greater than a preconfigured frequency; or determine to process the new message in the second message processing manner if frequency of using the application program by the user equipment is less than or equal to a preconfigured frequency; or determine to provide an alert for the new message in the third message processing manner if the distance between the user equipment and the wearable device is less than the preconfigured distance (or a power level of the transmit signal of the user equipment is the second power level), and frequency of using the application program by the user equipment is greater than a preconfigured frequency, or determine to process the new message in the second message processing manner if frequency of using the application program by the user equipment is less than or equal to a preconfigured frequency.

Figure 6:
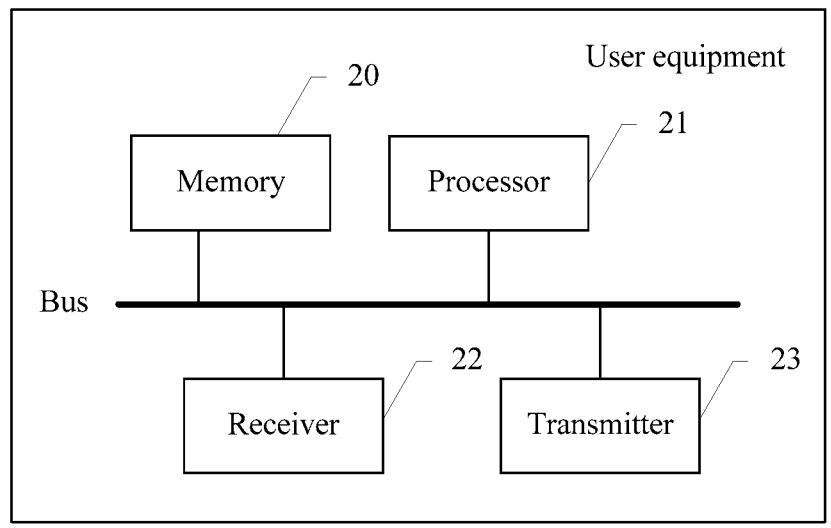
FIG. 6 is a schematic structural diagram of still another user equipment according to an embodiment of the present invention.

An embodiment of the present invention further provides another user equipment. A schematic structural diagram of the user equipment is shown in FIG. 6, and the user equipment includes a memory 20, a processor 21, a receiver 22, and a transmitter 23 that are separately connected to a bus, and further includes an output apparatus.

The memory 20 is configured to store information such as a necessary file for processing data by the processor 21, for example, the memory 20 is configured to store information such as program code for executing the foregoing message processing method by the processor 21. In this embodiment, the output apparatus included in the user equipment provides, mainly in a third message processing manner, an alert for a new message or a message that is not processed by a user, for example, reminds a user in a manner of a sound, vibration, screen-on, or a flashing light.

The processor 21 is configured to invoke program code stored in the memory 20, and execute the following method:

when a wearable device and the user equipment are in a connected state, if the receiver 22 receives a new message, determining information about a distance between the user equipment and the wearable device, or determining power information of a transmit signal from the user equipment to the wearable device; and then determining, according to the determined distance information or power information, that a processing manner for the new message is any one or more of the following processing manners: a first message processing manner, a second message processing manner, or a third message processing manner.

The first message processing manner is controlling the transmitter 23 to send a notification message to the wearable device, where the notification message is used to instruct the wearable device to provide an alert for a message; the second message processing manner is recording information about the new message; and the third message processing manner is providing an alert for a message by using the user equipment. In addition, when the wearable device or the user equipment provides an alert for the message, a notification is made mainly in two manners: One is a manner of vibration or a sound for alerting a user, the other is a manner of screen-on or a breathing light for alerting a user, where alert in this manner can avoid affecting another user. In addition, when determining the distance information, the processor 21 specifically determines the information about the distance between the user equipment and the wearable device according to a power level of the transmit signal from the user equipment to the wearable device, or determines the information about the distance between the user equipment and the wearable device according to signal strength of a received signal that is transmitted by the wearable device.

In this way, both the information about the distance between the user equipment and the wearable device and the power information can reflect an actual location status between the user equipment and the wearable device, and the user equipment processes the new message according to the actual location status between the user equipment and the wearable device; in addition, the wearable device is carried by a user. Therefore, the user equipment performs particular processing on the new message according to an actual location of the user, and it is ensured that the user can learn that the user equipment receives the new message when the user is in a wireless communication range of the user equipment, and it is not required to provide an alert for the new message when the user leaves the wireless communication range of the user equipment, which can reduce power consumption.

In a specific embodiment, the processor 21 is specifically configured to provide an alert for the new message in the first message processing manner or process the new message in the second message processing manner if the distance between the user equipment and the wearable device is greater than a preconfigured distance or a power level of the transmit signal of the user equipment is the first power level; or provide an alert for the new message in the third message processing manner if the distance between the user equipment and the wearable device is less than or equal to the preconfigured distance or a power level of the transmit signal of the user equipment is the second power level; where a power of the transmit signal is greater than a preconfigured value when the user equipment is at the first power level, or a power of the transmit signal is less than or equal to a preconfigured value when the user equipment is at the second power level.

Further, the processor 21 can be not only configured to determine the information about the distance between the user equipment and the wearable device or the power information when the receiver 22 receives the new message, but also configured to determine a configuration type of the wearable device if the user equipment receives the new message. In this case, the processor 21 is specifically configured to process the new message in the second message processing manner if the distance between the user equipment and the wearable device is greater than the preconfigured distance (or the power level of the transmit signal of the user equipment is the first power level), and the determined configuration type of the wearable device is a non-configurable type; or the user equipment provides an alert for the new message in the first message processing manner if the distance between the user equipment and the wearable device is greater than the preconfigured distance (or the power level of the transmit signal of the user equipment is the first power level), and the configuration type of the wearable device is a non-configurable type.

In another specific embodiment, the processor 21 is further configured to: when the wearable device and the user equipment are in a disconnected state, if the receiver 22 receives the new message, process the new message in the second message processing manner. In this case, the processor 21 is further configured to provide an alert for the new message in the third message processing manner if a quantity of times the receiver 22 receives the new message exceeds a preconfigured quantity of times within a preconfigured time.

In addition, the processor 21 is further configured to: if the user equipment has a message that is not processed by a user, when it is identified that the wearable device is in a wireless communication range of the user equipment, provide, in the third message processing manner, an alert for the message that is not processed by the user; or the processor 21 is configured to: if the user equipment has a message that is not processed by a user, when it is identified that a wearable device of the configurable type is in a wireless communication range of the user equipment, provide, in the first message processing manner or in the third message processing manner, an alert for the message that is not processed by the user. The processor 21 can further determine the information about the distance between the user equipment and the wearable device (for example, determine the distance information according to a power level used when the user equipment communicates with the wearable device), or the power information of the transmit signal from the user equipment to the wearable device; and provide, in the first message processing manner, an alert for the message that is not processed by the user if it is learned, according to the determined distance information, that the distance between the user equipment and the wearable device is greater than a preconfigured distance, or the power level of the transmit signal of the user equipment is the first power level; or provide, in the third message processing manner, an alert for the message that is not processed by the user if the distance between the user equipment and the wearable device is less than or equal to a preconfigured distance or the power level of the transmit signal of the user equipment is the second power level.

In order to prevent the user equipment from incorrectly processing or providing an alert for the message that is not processed by the user because the user carrying the wearable device temporarily enters the wireless communication range of the user equipment, the processor 21 is specifically configured to: when it is identified that the wearable device is in the wireless communication range of the user equipment within a preconfigured time, provide, in the third message processing manner, an alert for the message that is not processed by the user; or the processor 21 is specifically configured to: it is identified that the wearable device of the configurable type is in the wireless communication range of the user equipment within a preconfigured time, provide, in the first message processing manner or in the third message processing manner, an alert for the message that is not processed by the user.

Further, the processor 21 is further configured to determine the power level of the transmit signal according to signal strength of a signal that is transmitted by the wearable device and received by the receiver 22, and control the transmitter 23 to transmit a signal to the wearable device according to the determined power level.

Further, in another specific embodiment, the processor 21 not only can determine the information about the distance between the user equipment and the wearable device or power information when receiving the new message, but also is configured to determine any one or more pieces of the following information: a scene mode of the user equipment, information about using a loaded application program by the user equipment, status information of the wearable device, capability information of the wearable device, and information detected by the wearable device. The processor 21 is specifically configured to determine the processing manner for the new message according to the determined distance information or power information, and the determined any one or more pieces of information.

For example, if the any one or more pieces of information determined by the processor 21 are the information about using the loaded application program by the user equipment, and the new message is a notification message of the application program, the processor 21 is specifically configured to determine to provide an alert for the new message in the first message processing manner if the distance between the user equipment and the wearable device is greater than the preconfigured distance (or the power level of the transmit signal of the user equipment is the first power level), and frequency of using the application program by the user equipment is greater than a preconfigured frequency, or determine to process the new message in the second message processing manner if frequency of using the application program by the user equipment is less than or equal to a preconfigured frequency; or determine to provide an alert for the new message in the third message processing manner if the distance between the user equipment and the wearable device is less than the preconfigured distance (or the power level of the transmit signal of the user equipment is the second power level), and frequency of using the application program by the user equipment is greater than a preconfigured frequency, or determine to process the new message in the second message processing manner if frequency of using the application program by the user equipment is less than or equal to a preconfigured frequency.

An embodiment of the present invention further provides a message processing system, mainly including user equipment and a wearable device. A structure of the user equipment may be the structure of the user equipment shown in the foregoing FIG. 4, FIG 5, or FIG. 6, and details are not described herein. The wearable device is configured to receive a notification message sent by the user equipment, and provide an alert for a new message received by the user equipment.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The service processing method, system and device provided in the embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

The invention claimed is:

1. A user equipment, comprising:
at least one processor; and
a memory coupled to the at least one processor and storing programming instructions that, when executed by the at least one processor, cause the user equipment to:
 receive a message;
 determine a distance between the user equipment and a wearable device connected with the user equipment;
 when the distance between the user equipment and the wearable device is greater than a preconfigured distance, record information of the message without providing the information of the message;
 when the distance between the user equipment and the wearable device is less than the preconfigured distance, provide the information of the message; and
 provide an alert if a quantity of times the user equipment receives incoming calls from a same number exceeds a preconfigured quantity of times within a preconfigured time.

2. The user equipment according to claim 1, wherein the user equipment connects to the wearable device by using the Bluetooth protocol.

3. The user equipment according to claim 1, wherein the message is an instant message or an SMS message.

4. The user equipment according to claim 1, wherein the information of the message comprises content of the message.

5. The user equipment according to claim 1, wherein determining the distance between the user equipment and the wearable device comprises:
determining the distance between the user equipment and the wearable device according to signal strength of a signal that is transmitted by the wearable device and received by the user equipment.

6. The user equipment according to claim 1, wherein the memory further stores instructions that, when executed by the user equipment, cause the user equipment to:
determine at least one of the following information:
 a scene mode of the user equipment;
 status information of the wearable device; and
 information detected by the wearable device; and
determine a processing manner for the message according to the information.

7. A system, comprising:
a wearable device configured to collect motion detection information;
a user equipment connected with the wearable device and configured to:
 receive a message;
 determine a distance between the user equipment and a wearable device connected with the user equipment;
 when the distance between the user equipment and the wearable device is greater than a preconfigured distance, record information of the message without providing the information of the message;
 when the distance between the user equipment and the wearable device is less than the preconfigured distance, provide the information of the message; and
 provide an alert if a quantity of times the user equipment receives incoming calls from a same number exceeds a preconfigured quantity of times within a preconfigured time.

8. The system according to claim 7, wherein the user equipment connects to the wearable device by using the Bluetooth protocol.

9. The system according to claim 7, wherein the message is an instant message or an SMS message.

10. The system according to claim 7, wherein the information of the message comprises content of the message.

11. The system according to claim 7, wherein determining the distance between the user equipment and the wearable device comprises:
    determining the distance between the user equipment and the wearable device according to signal strength of a signal that is transmitted by the wearable device and received by the user equipment.

12. The system according to claim 7, wherein the user equipment is further configured to:
    determine at least one of the following information:
        a scene mode of the user equipment;
        status information of the wearable device; and
        information detected by the wearable device; and
    determine a processing manner for the message according to the determined information.

13. The system according to claim 7, wherein the wearable device is further configured to:
    detect a sleep status of a user.

14. A message processing method, comprising:
    receiving a message;
    determining a distance between a user equipment and a wearable device connected with the user equipment;
    when the distance between the user equipment and the wearable device is greater than a preconfigured distance, recording information of the message without providing the information of the message;
    when the distance between the user equipment and the wearable device is less than the preconfigured distance, providing the information of the message; and
    provide an alert if a quantity of times the user equipment receives incoming calls from a same number exceeds a preconfigured quantity of times within a preconfigured time.

15. The method according to claim 14, wherein the user equipment connects to the wearable device by using the Bluetooth protocol.

16. The method according to claim 14, wherein the message is an instant message or an SMS message.

17. The method according to claim 14, wherein the information of the message comprises content of the message.

18. The method according to claim 14, wherein determining the distance between the user equipment and the wearable device comprises:
    determining the distance between the user equipment and the wearable device according to signal strength of a signal that is transmitted by the wearable device and received by the user equipment.

* * * * *